(12) United States Patent
Alexander et al.

(10) Patent No.: US 12,185,391 B2
(45) Date of Patent: Dec. 31, 2024

(54) SHARED LOCK SCREEN ACROSS PAIRED DEVICES

(71) Applicant: Cisco Technology, Inc., San Jose, CA (US)

(72) Inventors: William Sterling Alexander, Durham, NC (US); Vikas Vashisht, Morrisville, NC (US); Shuli Jin, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/538,299

(22) Filed: Nov. 30, 2021

(65) Prior Publication Data

US 2023/0171819 A1    Jun. 1, 2023

(51) Int. Cl.
*H04W 76/10* (2018.01)
*G06F 21/50* (2013.01)
*H04L 43/10* (2022.01)

(52) U.S. Cl.
CPC ............ *H04W 76/10* (2018.02); *G06F 21/50* (2013.01); *H04L 43/10* (2013.01); *G06F 2221/2149* (2013.01)

(58) Field of Classification Search
CPC ..................... H04W 76/10; G06F 21/50; G06F 2221/2149; H04L 43/10
See application file for complete search history.

(56) References Cited

U.S. PATENT DOCUMENTS

| | | | |
|---|---|---|---|
| 8,869,305 B1 * | 10/2014 | Huang | G06F 21/31 380/258 |
| 9,369,567 B2 * | 6/2016 | Yoon | G06F 3/0346 |
| 9,380,463 B2 | 6/2016 | Lee et al. | |
| 9,754,092 B2 | 9/2017 | Newell | |
| 9,826,561 B2 * | 11/2017 | Bolin | H04W 4/80 |
| 10,278,075 B2 * | 4/2019 | Lee | H04W 4/80 |
| 10,572,639 B2 | 2/2020 | Ranjit et al. | |
| 11,055,392 B2 | 7/2021 | Ulrich et al. | |
| 11,582,215 B2 * | 2/2023 | Benson | H04W 12/041 |
| 2015/0020081 A1 * | 1/2015 | Cho | H04M 1/72436 719/318 |
| 2015/0338979 A1 * | 11/2015 | Rhee | G06F 1/163 345/174 |
| 2016/0065831 A1 * | 3/2016 | Howard | H04N 5/23203 348/211.2 |
| 2016/0192193 A1 * | 6/2016 | Lee | H04L 63/0853 455/411 |
| 2016/0342784 A1 * | 11/2016 | Beveridge | G06F 21/34 |
| 2017/0085565 A1 * | 3/2017 | Sheller | G06F 21/305 |
| 2018/0067712 A1 * | 3/2018 | Behzadi | G06F 13/128 |
| 2020/0117350 A1 | 4/2020 | Zhu et al. | |
| 2021/0004447 A1 * | 1/2021 | Kosugi | G06F 21/35 |
| 2021/0349619 A1 * | 11/2021 | Crowley | G06F 3/04847 |

\* cited by examiner

*Primary Examiner* — Azizul Choudhury
(74) *Attorney, Agent, or Firm* — BEHMKE INNOVATION GROUP LLC; James M. Behmke; Keith O. Mitchell

(57) ABSTRACT

In one embodiment, a telephony device establishes a pairing connection with a user device. The telephony device disables, based on the pairing connection with the user device, a default screen locking policy of the telephony device. The telephony device polls a screen lock status of the user device to determine whether the user device is locked. The telephony device locks the telephony device when the screen lock status of the user device indicates that the user device is locked.

14 Claims, 6 Drawing Sheets

SHARED LOCK SCREEN ACROSS PAIRED DEVICES

TECHNICAL FIELD

The present disclosure relates generally to computer networks, and, more particularly, to a shared locked screen across paired devices.

BACKGROUND

Hot desking or "flex" spaces have become increasingly popular, where workers, guests, etc. may use physical office space that is not permanently assigned to any particular individual. Instead, one may temporarily use a previously conventional office area for any desired amount of time. Such spaces, in addition to offering a physical location for work, may also offer tools that allow users to quickly re-create an office setting. Specifically, a telephony device or hub within a space may be connected to a user's computing device (e.g., laptop, smartphone, etc.), where the telephony device may provide quick access to the Internet, an enterprise working environment, and one or more collaboration hardware/software tools (e.g., teleconferencing, calendar viewing, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
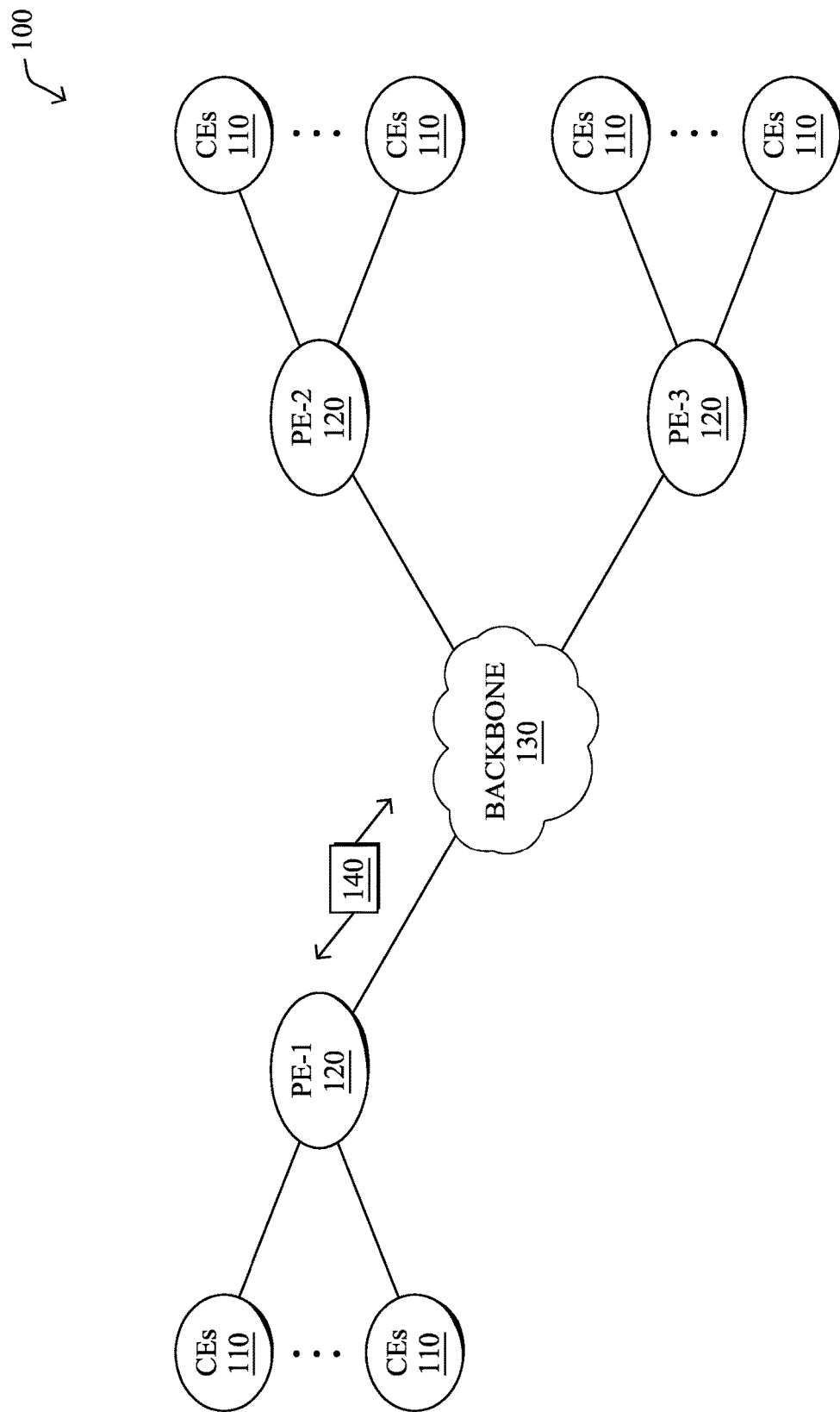
FIGS. 1A-1B illustrate an example communication network.

According to one or more embodiments of the disclosure, a telephony device establishes a pairing connection with a user device. The telephony device disables, based on the pairing connection with the user device, a default screen locking policy of the telephony device. The telephony device polls a screen lock status of the user device to determine whether the user device is locked. The telephony device locks the telephony device when the screen lock status of the user device indicates that the user device is locked.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in computer network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to computer network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
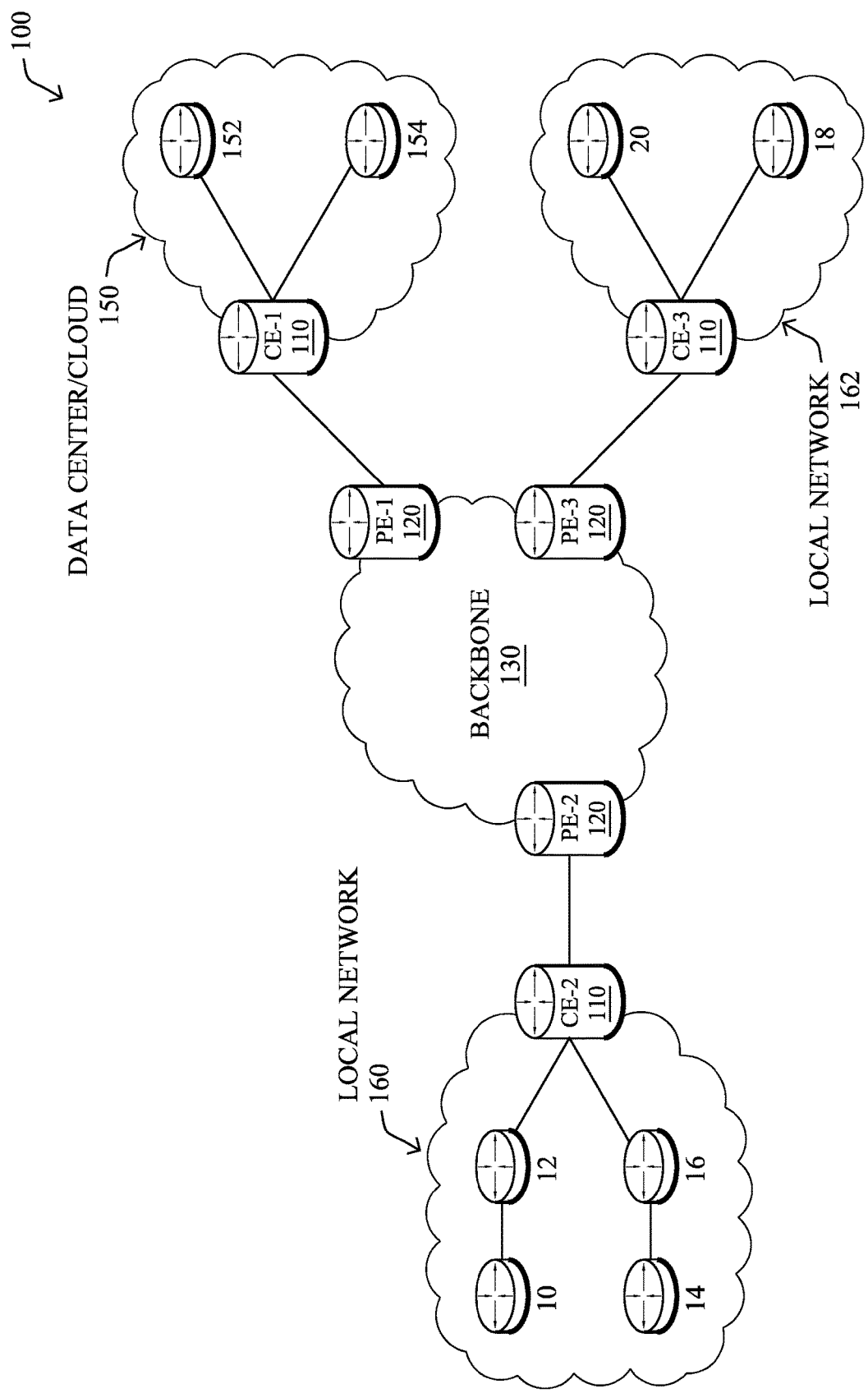

FIG. 1B illustrates an example of computer network 100 in greater detail, according to various embodiments. As shown, network backbone 130 may provide connectivity between devices located in different geographical areas and/or different types of local networks. For example, computer network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, computer network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in computer network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
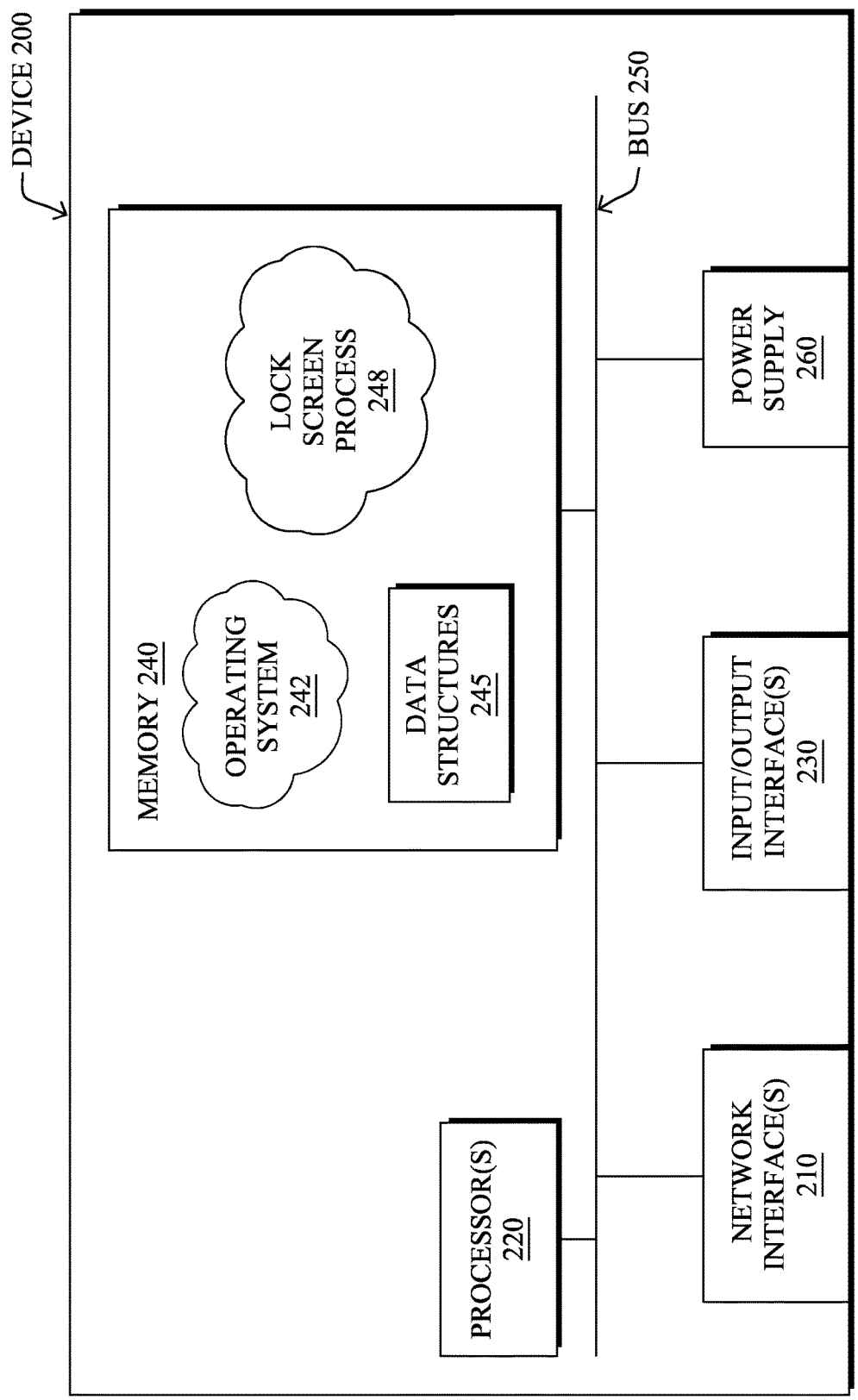
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of computer network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the computer network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise lock screen process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, a variety of factors have changed what is expected out of conventional office settings. Notably, hot desking or "flex" spaces have become increasingly popular, where workers, guests, etc. may use physical office space that is not permanently assigned to any particular individual. Instead, one may use a desk, area, etc. for a few hours, a day, or any desired amount of time. In addition to physical working space and office accessories, individual hot desks or "flex" spaces may provide a telephony device or hub that is connected to the Internet, enterprise/work networking, etc. as well as a plurality of other electronic devices (e.g., computer monitors, speakerphones, webcams, etc.) that an individual may use when occupying the space. Such telephony device or hub oftentimes allow users to connect their individually assigned computing devices (e.g., laptop, smartphone, etc.) to the telephony device so that the users may use the telephony device (and devices connected to it) to further re-create an office experience. In some cases, the telephony device or hub may also temporarily obtain personalized information about a user (after they have paired their user device) that may include calendar information about the user, user preferences, user information etc. Thus, the re-created office experience may also be personalized based on the user.

However, the convenience of hot desks and "flex" spaces presents concerns regarding security. In particular, such spaces are presented as public spaces until a user begins using them, and, once they are in use, sensitive and/or personal information may be accessible to the telephony device or hub (and other devices). The telephony device or hub may be configured to retain a device-specific locking mechanism, which locks the telephony device (e.g., a PIN, password, etc.). However, the device-specific locking mechanism is "walled off" from any locking mechanism that may be implemented on the user device.

Shared Locked Screen Across Paired Devices

The techniques herein, therefore, provide for shared locked screen across paired devices, particularly, a telephony device (in a hot desk or "flex" space) and a user device (e.g., laptop, mobile phone, etc.). Notably, one or more lock policies implemented on user device may be applied to a telephony device, after a pairing connection is formed between the two devices. The user device's own, potentially complex, lock screen and device management policy may control access to the telephony device while it is in use by a user, where the telephony device may override a default (or native) screen lock policy of the telephony device (that is applied when the user device is not paired). Specifically, one or more user device lock mechanisms (e.g., inactivity, remote lock, etc.) may be leveraged to also lock the telephony device when both devices are paired. Further, one or more user device unlock mechanisms (e.g., biometric(s), password, etc.) may be leveraged to also unlock the telephony device.

Specifically, according to various embodiments, a telephony device establishes a pairing connection with a user device. The telephony device disables, based on the pairing connection with the user device, a default screen locking policy of the telephony device. The telephony device polls a screen lock status of the user device to determine whether the user device is locked. The telephony device locks the telephony device when the screen lock status of the user device indicates that the user device is locked.

Illustratively, the techniques described herein may be performed by hardware, software, and/or firmware, such as in accordance with the lock screen process 248, which may include computer executable instructions executed by the processor 220 (or independent processor of interfaces 210) to perform functions relating to the techniques described herein.

Figure 3:
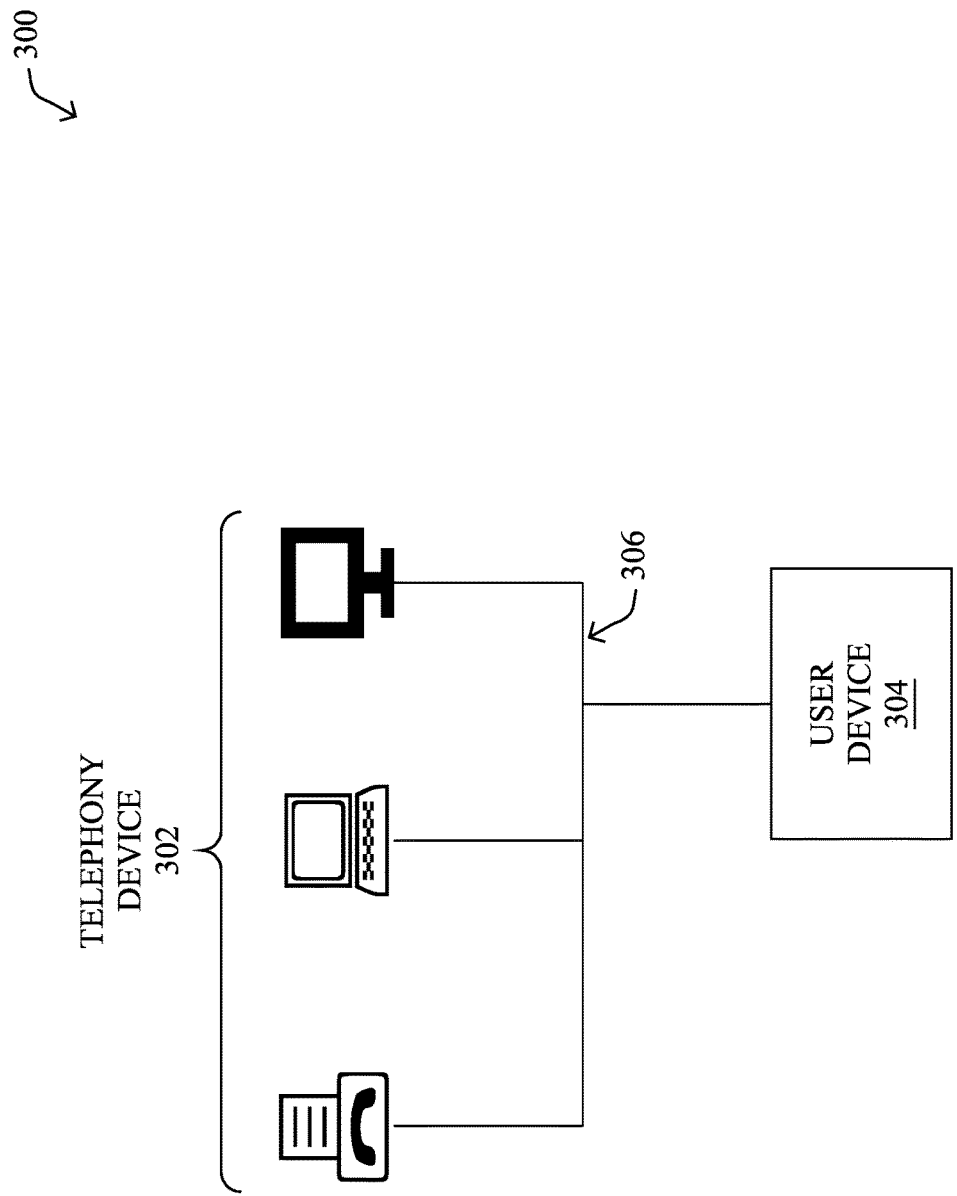
FIG. 3 illustrates an example architecture for a shared lock screen across paired devices.

Operationally, FIG. 3 illustrates an example architecture 300 for a shared lock screen across paired devices, where architecture 300 may include telephony device 302 and user device 304. Telephony device 302 (which may also be termed a collaboration device) may comprise, for example, a Cisco Webex™ Desk Hub™, Cisco Webex™ Desk Pro™, or any other collaboration device that may be installed in a hot desk or "flex" space setting, where telephony device 302 may comprise a docking station which offers features including teleconferencing, phone calls, collaboration, etc. Telephony device 302 may be connected to a plurality of office peripherals, including mice, keyboards, monitors, webcams, microphones, etc. that are used along with collaboration tools, including videoconferencing, group-based virtual presentations, calendar sharing/management, document viewing, etc. User device 304 may comprise any user computing device which a user may use in an enterprise (associated with telephony device 302), for example, a laptop, cellphone, etc.

Generally, it may be assumed that telephony device 302 may, prior to being "paired" with user device 304, have its own default screen lock or access policy associated with it (for example, it may lock according to an inactivity timer and unlock according to a PIN or password requirement). That is, while telephony device 302 may provide collaboration or telephony features "unpaired" (e.g., teleconferencing based on a user login), such features are oftentimes done without personalization, localization, etc. that may be implemented based on an end user's desires. Notably, when telephony device 302 is connected to user device 304, it is to be understood that telephony device 302 may be configured to offer one or more features or customizations that are based on a profile, identity, etc. associated with user device 304. That is, after a pairing between the device, telephony device 302 may be configured to obtain, for example, a locale associated information (e.g., a language, keyboard layout preference, time zone etc.), one or more accessibility settings, energy savings or idle time policies, screen saver and other interface customizations, as well as audio/video settings regarding user device 304. All of this information may then be applied to telephony device 302 while user device 304 is paired with telephony device 302. Further, such information may be obtained by telephony device 302 from a server or cloud based storage system using a token, identifier, etc. associated with user device 304 (that is determined after a pairing connection is formed between telephony device 302 and user device 304).

User device 304 may be understood as a standalone computing device (e.g., a laptop, mobile phone, etc.) that implements one or more standalone lock/unlock policies that govern access to user device 304. For example, locking user device 304 may be controlled by an operating system, mobile device management, etc., where a locking mechanism may be based on: a) inactivity (e.g., a time-based or sensor based timeout that locks that device when it is not used), b) connection loss (e.g., a loss of a Bluetooth, Wi-Fi, etc. connection); c) a remote lock feature associated with a cloud or mobile device management policy that is managed by a device manufacturer or enterprise device owner); or d) a parental lock (based on time or for individual applications). Unlocking user device 304 may be based on, for example, biometrics-based components (e.g., a face/voice recognition, fingerprint sensors, etc.), PIN/passwords, a remote lock feature, or a parental lock.

As shown in FIG. 3., one or more connections 306 may be made between telephony device 302 and user device 304, where the one or more connections 306 may include be a wired connection (e.g., a USB-C cable). Upon connecting telephony device 302 and user device 304, telephony device 302 may be understood as relying on a lock state (and thus one or more locking and unlocking mechanisms of user device 304) to determine a lock state of telephony device 302. In particular, user device 304 may have one or more of its lock screen policies predetermined by, for example, an IT administrator of an enterprise which owns user device 304. That is, whether telephony device 302 is locked or unlocked would depend entirely on a lock state of user device 304. In one example, if both user device 304 and telephony device 302 are locked, an unlock on user device 304 would also trigger and unlock on telephony device 302. For example, in a case where no activity is detected on telephony device 302, it may still be unlocked as long as there is activity on user device 304. An end user may, thus, primarily work using user device 304 but may quickly access one or features like making teleconference calls, calendar views, etc. provided by telephony device 302 (without having to separately unlock it).

In one embodiment, it is contemplated that one or more applications running on user device 304 may be control whether telephony device 302 is locked or unlocked. That is, instead of an operating system-level locking policy of user device 304 controlling a locked state of telephony device 302, an individual application, for example, a collaboration-based application (e.g., Cisco Webex™, Microsoft Teams™, etc.) may be used to dictate whether telephony device 302 is locked or unlocked, according to the techniques described herein.

Figure 4:
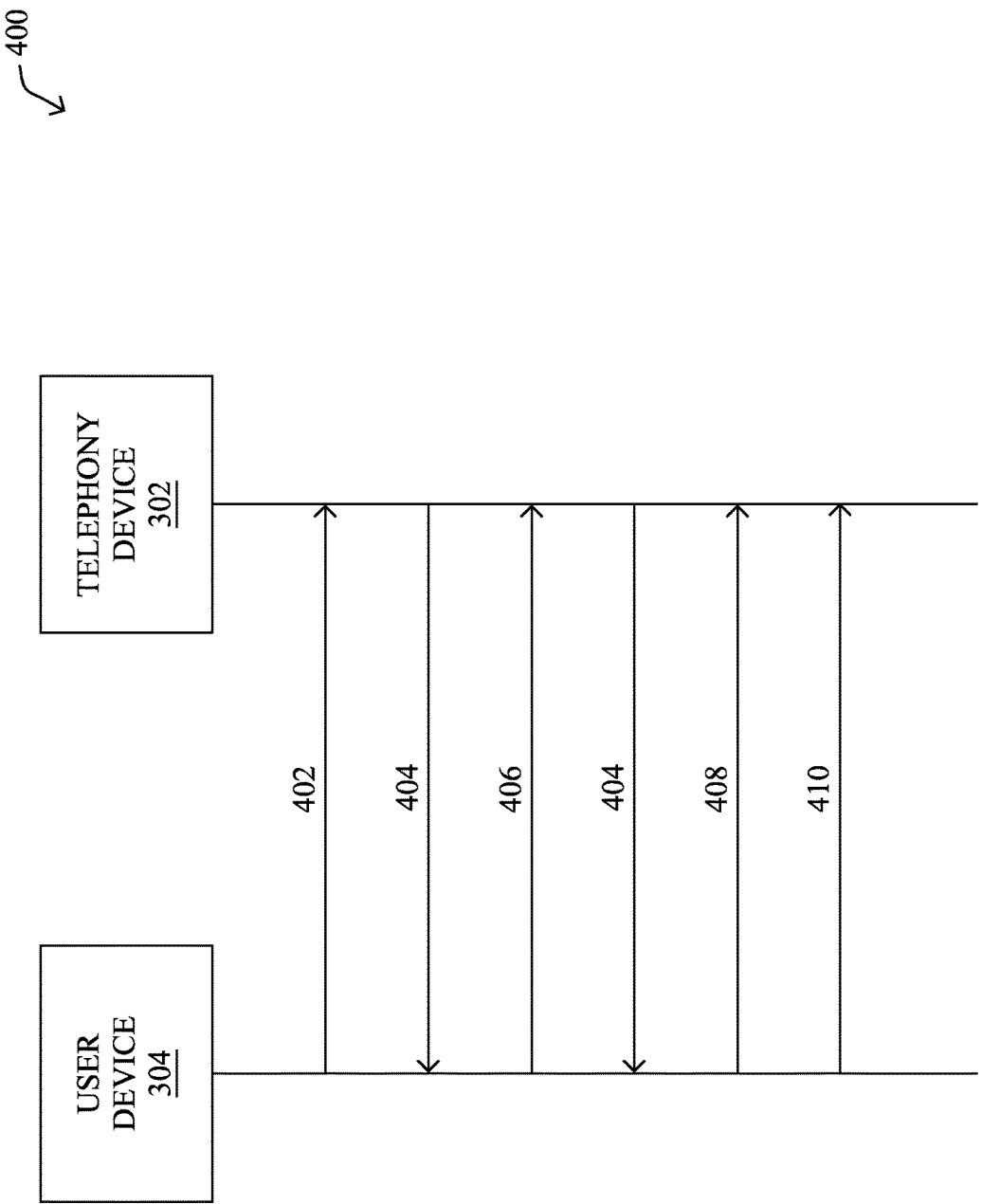
FIG. 4 illustrates an example message flow diagram for a shared lock screen across paired devices.

FIG. 4 illustrates an example message flow diagram 400 for a shared lock screen across paired devices. In particular, upon a user forming a connection between telephony device 302 and user device 304, user device 304 may be configured to establish a messaging service using one or more messages 402. Such messaging service may be based on docking or proximity based communication protocols understood in the art, for example, USB-C, FIDO U2F, ultrasound, near-field communication (NFC), Bluetooth Low Energy (BLE), etc., which results in telephony device 302 and user device 304 forming a pairing connection. For example, pairing messages may be sent according to the USB-C protocol, where such messages indicate a lock status of user device 304 and control how the pairing connection is deemed "active". In addition, pairing between telephony device 302 and user device 304 may be facilitated over a cloud (or enterprise) network, where a token may be implemented for authentication and credentialing purposes.

Further, upon establishing a pairing connection between the two devices, telephony device 302 may enter a "personal mode", which as described in greater detail herein above, may apply one or more features or customizations that are based on a profile, identity, etc. associated with user device 304. That is, telephony device 302 may change its localization settings, accessibility settings, etc., according to what is enabled on user device 304 and for a temporary time period (e.g., only when the devices have a pairing connection established). In a specific example, telephony device 302 may be configured to obtain calendar information associated with user device 304 and provide calendaring features on telephony device 302 (based on the information). In another example, telephony device 302 may automatically change its default language setting to a language setting found on user device 304.

Telephony device 302 may then be configured to, after the pairing connection is formed, disable one or more default access policies that may be installed on telephony device 302 that control a lock state of telephony device 302. Telephony device 302 may further be configured to then periodically poll a lock state status of user device 304 by using one or screen lock status messages 404. It is contemplated that polling of the lock state status may be performed by telephony device 302 itself (e.g., at an operating system or firmware level), or, alternatively, the polling may occur by an application that is installed on telephony device 302 that is configured to notify (telephone device 302) of the lock state status. In addition, telephony device 302 may be poll a lock status of user device 304 only when telephony device 302 is not being used so as to prevent the telephony device 302 from being locked when it is in use (while a lock action occurs on user device 304).

In the case where user device 304 has been set to be in a lock state (either by an end user locking device or user device 304 automatically locking due to a time out), user device 304 may send a lock status message 406 that indicates that its lock state is locked to telephony device 302. Telephony device 302, upon receiving this message, may then lock itself according to the lock state of user device 304. In another case where user device has been set to be in an unlocked state user device 304 may send a lock status message 408 that indicates that its lock state is unlocked to telephony device 302. Telephony device 302, upon receiving this message, may then unlock itself according to the lock state of user device 304. It is to be understood that one or screen lock status messages 404, lock status message 406, and lock status message 408 may be communicated using a communications protocol, standard, etc. than what is used to establish the initial pairing connection between user device 304 and telephony device 302 (e.g., using one or more messages 402).

Further, when a user of user device 304 disconnects the connection between telephony device 302 and user device 304, the pairing connection between the two devices may be understood as disabled. Such disabling of the pairing connection may cause telephony device 302 to stop polling user device 304 using one or screen lock status messages 404. In addition, telephony device 302 may revert to its own default screen locking policy and to disable any personalization features that has temporarily enabled.

Figure 5:
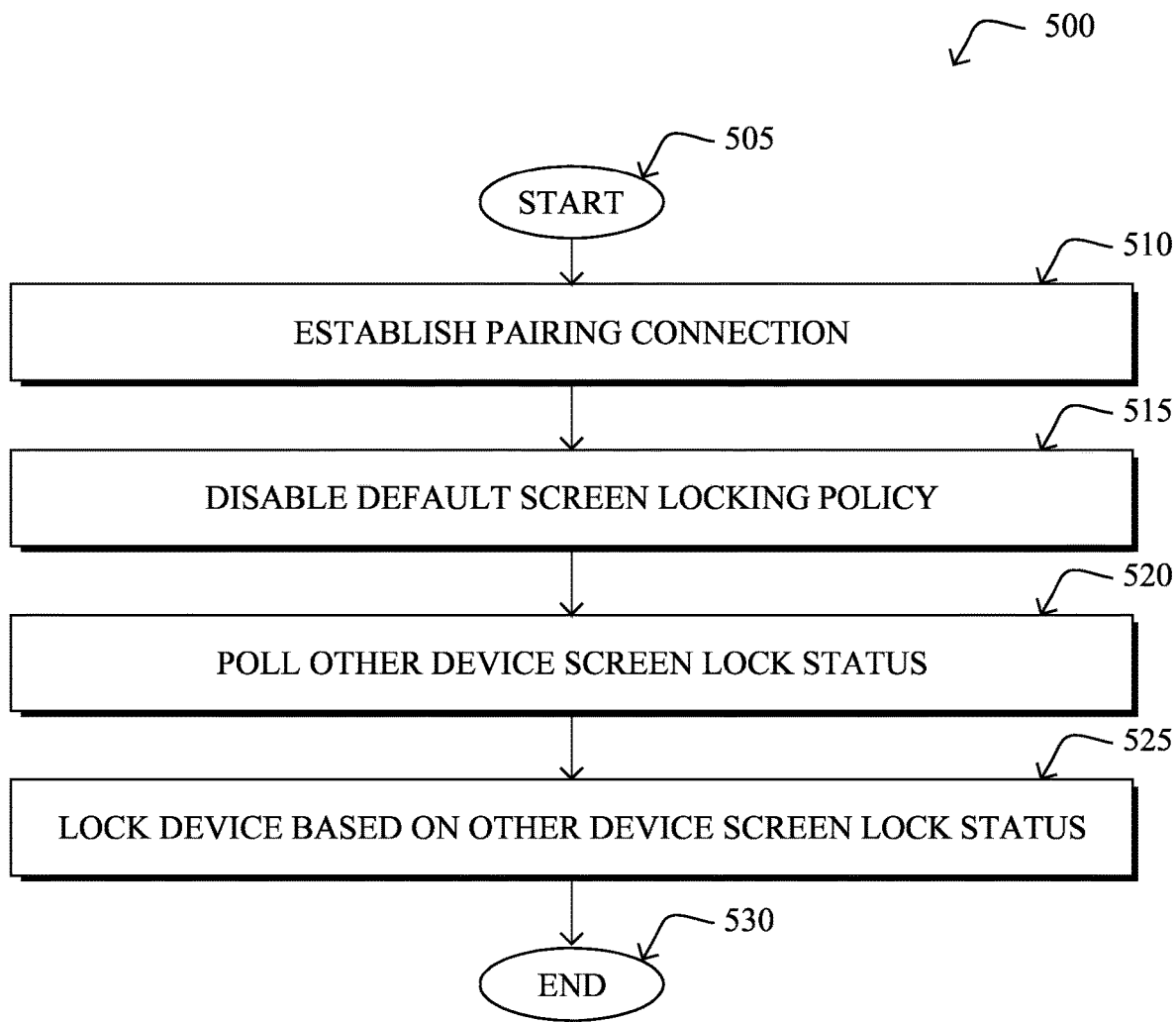
FIG. 5 illustrates an example simplified procedure for a shared locked screen across paired devices.

FIG. 5 illustrates an example simplified procedure (e.g., a method) for a shared lock screen across pair devices, in accordance with one or more embodiments described herein. For example, a non-generic, specifically configured device (e.g., device 200), may perform procedure 500 by executing stored instructions (e.g., lock screen process 248). The procedure 500 may start at step 505, and continues to step 510, where, as described in greater detail above, a telephony device may establish a pairing connection with a user device. For instance, the telephony device may comprise a computing device and/or hardware or software configured to provide videoconferencing, group-based virtual presentations, calendar sharing/management, or document viewing. Further, the user device may comprise a laptop or mobile phone In some embodiments, the telephone device may obtain personalization information associated with the user device. Of note, the personalization information may comprise locale associated information, accessibility settings, energy savings or idle time policies, interface customizations, or audio/video settings.

At step 515, as detailed above, the telephony device, based on the pairing connection with the user device, a default screen locking policy of the telephony device. In some embodiments, the default screen locking policy may lock the telephony device according to an inactivity timer and unlocks the telephony device according to a PIN or password. Further, the telephone device may apply, based on the personalization information, one or more temporary feature changes to the telephony device. In one or more embodiments, the pairing connection may be established over USB-C At step 520, the telephony device may poll a screen lock status of the user device to determine whether the user device is locked. In an embodiment, polling the screen lock status of the user device to determine whether the user device is locked may be performed only when the telephony device is idle At step 525, as detailed above, the telephony device may lock the telephony device when the screen lock status of the user device indicates that the user device is locked, as described in greater detail above. In an embodiment, the telephony device may unlock the telephony device when the screen lock status of the user device indicates that the user device is unlocked. In some embodiments, the device may receive a request to disable the pairing connection with the user device and may enable, based on the request to disable to the pairing connection, the default screen locking policy of the telephony device. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism to share a screen lock status of a particular device (e.g., a laptop or mobile phone) with another device (e.g., a telephony device), where the other device overrides a default screen locking policy upon forming a pairing connection with the particular device. Doing so can help to prevent unnecessary friction when a user accesses the other device (e.g., a telephony device for access to collaboration tools), while the user is using the particular device. Such techniques may be performed independent of proximity (e.g., location) based techniques and, are instead, based on locking/unlocking mechanisms that are native to the particular device. Therefore, instead of each device having its own screen locking policy, one device may control a lock/unlock status of another.

While there have been shown and described illustrative embodiments that provide a shared lock screen across pair devices, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of telephony devices or user devices, collaboration tools, or screen unlocking/locking mechanisms are discussed herein, the techniques herein may be used in conjunction with any telephony devices or user devices, collaboration tools, or screen unlocking/locking mechanisms.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   establishing, by a collaboration device that is not assigned to any user, a pairing connection with a user device of a particular user for temporary use of the collaboration device;
   disabling, by the collaboration device and based on the pairing connection with the user device, a default screen locking policy of the collaboration device;
   obtaining, by the collaboration device, personalization information associated with the user device;
   applying, by the collaboration device, one or more temporary feature changes to the collaboration device based on the personalization information during the temporary use of the collaboration device by the particular user;
   obtaining, by the collaboration device, a screen lock status of the user device to determine whether the user device is locked or unlocked;
   unlocking, by the collaboration device, the collaboration device when the screen lock status of the user device indicates that the user device is unlocked;
   locking, by the collaboration device and only when the collaboration device is idle, the collaboration device when the screen lock status of the user device indicates that the user device is locked;
   receiving, by the collaboration device, a request to disable the pairing connection with the user device;
   enabling, by the collaboration device and based on the request to disable the pairing connection, the default screen locking policy of the collaboration device; and disabling, by the collaboration device and based on the request to disable the pairing connection, the one or more temporary feature changes to the collaboration device.

2. The method as in claim 1, wherein the default screen locking policy locks the collaboration device according to an inactivity timer and unlocks the collaboration device according to a PIN or password.

3. The method as in claim 1, wherein obtaining, by the collaboration device, the screen lock status of the user device to determine whether the user device is locked is performed only when the collaboration device is idle.

4. The method as in claim 1, wherein the personalization information comprises locale associated information, accessibility settings, energy savings or idle time policies, interface customizations, or audio/video settings.

5. The method as in claim 1, wherein the user device comprises a laptop or mobile phone.

6. The method as in claim 1, wherein the collaboration device provides videoconferencing, group-based virtual presentations, calendar sharing/management, or document viewing.

7. The method as in claim 1, wherein the pairing connection is established over USB-C.

8. An apparatus, comprising:
one or more network interfaces;
a processor coupled to the one or more network interfaces and configured to execute one or more processes; and
a memory configured to store a process that is executable by the processor, the process when executed configured to:
  establish, by a collaboration device that is not assigned to any user, a pairing connection with a user device of a particular user for temporary use of the collaboration device;
  disable, based on the pairing connection with the user device, a default screen locking policy of the collaboration device;
  obtain personalization information associated with the user device;
  apply one or more temporary feature changes to the collaboration device based on the personalization information during the temporary use of the collaboration device by the particular user;
  obtain a screen lock status of the user device to determine whether the user device is locked or unlocked;
  unlock the collaboration device when the screen lock status of the user device indicates that the user device is unlocked;
  lock the collaboration device only when the collaboration device is idle and the screen lock status of the user device indicates that the user device is locked;
  receive a request to disable the pairing connection with the user device; and
  enable, based on the request to disable the pairing connection, the default screen locking policy of the collaboration device; and
  disable, based on the request to disable the pairing connection, the one or more temporary feature changes to the collaboration device.

9. The apparatus as in claim 8, wherein the default screen locking policy locks the collaboration device according to an inactivity timer and unlocks the collaboration device according to a PIN or password.

10. The apparatus as in claim 8, wherein obtaining the screen lock status of the user device to determine whether the user device is locked is performed only when the collaboration device is idle.

11. The apparatus as in claim 8, wherein the personalization information comprises locale associated information, accessibility settings, energy savings or idle time policies, interface customizations, or audio/video settings.

12. The apparatus as in claim 8, wherein the user device comprises a laptop or mobile phone.

13. The apparatus as in claim 8, wherein the collaboration device provides videoconferencing, group-based virtual presentations, calendar sharing/management, or document viewing.

14. A tangible, non-transitory, computer-readable medium storing program instructions that cause a collaboration device to execute a process comprising:
  establishing, by the collaboration device that is not assigned to any user, a pairing connection with a user device of a particular user for temporary use of the collaboration device;
  disabling, based on the pairing connection with the user device, a default screen locking policy of the collaboration device;
  obtaining personalization information associated with the user device;
  applying one or more temporary feature changes to the collaboration device based on the personalization information during the temporary use of the collaboration device by the particular user;
  obtaining a screen lock status of the user device to determine whether the user device is locked or unlocked;
  unlocking the collaboration device when the screen lock status of the user device indicates that the user device is unlocked;
  locking the collaboration device only when the collaboration device is idle and the screen lock status of the user device indicates that the user device is locked;
  receiving a request to disable the pairing connection with the user device;
  enabling, based on the request to disable the pairing connection, the default screen locking policy of the collaboration device; and
  disabling, based on the request to disable the pairing connection, the one or more temporary feature changes to the collaboration device.

\* \* \* \* \*